US006894761B2

(12) United States Patent
Ayash et al.

(10) Patent No.: US 6,894,761 B2
(45) Date of Patent: May 17, 2005

(54) METHOD AND APPARATUS FOR CONTROLLING HUMIDITY IN A COPYING DEVICE

(75) Inventors: Karl B. Ayash, Webster, NY (US); Thomas C. Hollar, Penfield, NY (US); Ali R. Dergham, Rochester, NY (US); David N. Redden, Penfield, NY (US); John H. Steele, Spencerport, NY (US)

(73) Assignee: Xerox Corporation, Stamford, CT (US)

( * ) Notice: Subject to any disclaimer, the term of this patent is extended or adjusted under 35 U.S.C. 154(b) by 128 days.

(21) Appl. No.: 10/624,806

(22) Filed: Jul. 22, 2003

(65) Prior Publication Data

US 2004/0125349 A1 Jul. 1, 2004

Related U.S. Application Data

(62) Division of application No. 09/714,994, filed on Nov. 20, 2000, now Pat. No. 6,621,554.
(60) Provisional application No. 60/200,807, filed on May 1, 2000.

(51) Int. Cl.[7] .......................... G03B 27/52; G03B 21/20
(52) U.S. Cl. .............................. 355/30; 399/93; 399/92
(58) Field of Search ....................... 355/30, 53; 399/44, 399/58, 103, 40, 92, 93, 97; 347/55

(56) References Cited

U.S. PATENT DOCUMENTS 4,367,036 A 1/1983 Sakamaki et al.
4,583,112 A * 4/1986 Morano et al. ............. 399/103
4,982,225 A 1/1991 Sakakibara et al.
5,144,366 A 9/1992 Sakamoto et al.
5,206,754 A 4/1993 Yano et al.
5,530,523 A 6/1996 Kawabata
5,689,766 A * 11/1997 Hollar et al. ................. 399/92
5,708,938 A 1/1998 Takeuchi et al.
5,710,958 A 1/1998 Raj
6,049,680 A 4/2000 Goris et al.
6,102,527 A 8/2000 Tsukamoto et al.
6,219,679 B1 4/2001 Brisebois et al.
6,334,033 B1 12/2001 Ayash et al.
2001/0048513 A1 12/2001 Nagahashi
2002/0057921 A1 * 5/2002 Ihara et al. ................... 399/93

FOREIGN PATENT DOCUMENTS

EP 0 629 931 A 12/1994
JP 03 193372 A 8/1991
JP 05 19581 A 1/1993
JP 8-335025 12/1996

OTHER PUBLICATIONS

Wilson, "Air Conditioning of Xerographic Reproductions Machines", Xerox Disclosure Journal, vol. 1, No. 7, Jul. 1976, p. 69.
Xerox Corporation, "Pressurized and Filtered Xerographic System", Research Disclosure, Dec. 1975, pp. 50–51.

* cited by examiner

*Primary Examiner*—Peter B. Kim
(74) *Attorney, Agent, or Firm*—Oliff & Berridge, PLC

(57) ABSTRACT

A method and apparatus are provided to control the atmosphere inside of a xerographic control module of an image forming device so that a dew point condition is not reached. The parameters of the atmosphere within the xerographic chamber which are controlled include pressure, temperature and humidity.

18 Claims, 10 Drawing Sheets

GRAINS OF WATER TABLE

| RH % → / T °F | 10 | 12.5 | 15 | 17.5 | 20 | 22.5 | 25 | 27.5 | 30 |
|---|---|---|---|---|---|---|---|---|---|
| 79 | 15 | 18 | 22 | 26 | 29 | 33 | 37 | 40 | 44 |
| 80 | 15 | 19 | 23 | 26 | 30 | 34 | 38 | 42 | 46 |
| 81 | 16 | 19 | 23 | 27 | 31 | 35 | 39 | 43 | 47 |
| 82 | 16 | 20 | 24 | 28 | 32 | 36 | 40 | 45 | 49 |
| 83 | 17 | 21 | 25 | 29 | 33 | 38 | 42 | 45 | 50 |
| 84 | 17 | 21 | 26 | 30 | 34 | 39 | 43 | 46 | 52 |
| 85 | 18 | 22 | 27 | 31 | 36 | 40 | 45 | 49 | 54 |
| 86 | 18 | 23 | 28 | 32 | 37 | 41 | 46 | 51 | 55 |
| 87 | 19 | 24 | 28 | 33 | 38 | 43 | 48 | 52 | 57 |
| 88 | 20 | 24 | 29 | 34 | 39 | 44 | 49 | 54 | 59 |
| 89 | 20 | 25 | 30 | 35 | 40 | 46 | 51 | 56 | 61 |
| 90 | 21 | 26 | 31 | 36 | 42 | 47 | 52 | 58 | 63 |
| 91 | 21 | 27 | 32 | 38 | 43 | 49 | 54 | 59 | 65 |
| 92 | 22 | 28 | 33 | 39 | 44 | 51 | 55 | 61 | 67 |
| 93 | 23 | 29 | 34 | 40 | 46 | 52 | 57 | 63 | 69 |
| 94 | 24 | 30 | 35 | 41 | 47 | 53 | 58 | 65 | 71 |
| | FAULT CONDITION - TEMP. 95°F OR MORE | | | | | | | | |

44

FIG. 5

METHOD AND APPARATUS FOR CONTROLLING HUMIDITY IN A COPYING DEVICE

CROSS-REFERENCE TO RELATED APPLICATIONS

This is a divisional of U.S. application Ser. No. 09/714,994 filed Nov. 20, 2000, now U.S. Pat. No. 6,621,554 which is based on U.S. Provisional Appln. No. 60/200,807 filed May 1, 2000 by the same inventors, and claims priority therefrom. This divisional application is being filed in response to a restriction requirement in that prior application and contains re-written and/or additional claims to the restricted subject matter.

BACKGROUND OF THE INVENTION

This invention concerns maintaining the temperature and relative humidity of the air within an image forming device.

This invention is related to U.S. Pat. No. 6,334,033 issued Dec. 25, 2001, entitled, "Ambient Atmospheric Pressure Compensation Controller for Pressurized Copy Device," which is incorporated herein by reference in its entirety.

Certain image forming devices, such as, for example, photocopiers, require a temperature controlled environment for increased operational efficiency. However, introducing air conditioning to such devices presents a potential problem in that water vapor in the conditioned air which is used to control the temperature of the device may condense onto component parts of the device.

In U.S. Pat. No. 4,367,036, a temperature and humidity compensating device uses a temperature sensor to detect the temperature of the photosensitive member. A control means is used to control a source of heat located inside the photosensitive member. The heat source is used to keep the temperature of the photosensitive member above ambient temperature to prevent moisture from condensing on, and absorbed by, the photosensitive member.

In U.S. Pat. No. 5,530,523, sensors are provided near the photosensitive member to measure the temperature and humidity near the outer surface of the photosensitive member. A means for calculating a water vapor density is associated with the measured temperature and humidity. A control unit compares a pre-selected water vapor density with the calculated water vapor density. A control unit activates a heater inside the photosensitive member to prevent forming of dew on the photosensitive member based on the comparison.

In U.S. Pat. No. 4,982,225, an image forming apparatus form an image of high quality even in a highly humid atmosphere. Humidity in the apparatus is detected and a heating means is activated by a controller connected to the humidity detecting means. The microcapsule paper used in the device is heated when the humidity is at or below a certain value.

U.S. Pat. No. 5,144,366 discloses a cooling system for an image forming machine that includes a single temperature sensor to detect the temperature inside of the machine and to control the operation of a cooling fan. The cooling fan is used to lower the temperature inside the machine in accordance with the detected temperature and the number of sheets to be copied.

U.S. Pat. No. 5,206,754 discloses a moisture condensation prevention structure for a laser scanning optical system in an electro-photographic image forming device that includes a device for preventing air from circulating in the laser beam optical assembly casing by separating the casing into different compartments.

SUMMARY OF THE INVENTION

Introducing air conditioning presents a potential problem, in that condensation can accumulate on critical machine parts.

None of these devices discloses the unique methods and devices employed by this invention to achieve moisture condensation control.

This invention provides methods and apparatus that control the properties of air supplied to at least a portion of an image forming device to avoid a dew point condition in that portion of the image forming device.

This invention separately provides systems and methods that control the air temperature and relative humidity to avoid dew point conditions in at least a portion of an image forming device.

Air which circulates throughout an image forming device may contain relatively high relative humidity. The water vapor contained in such air may condense on various elements of the image forming device causing unwanted effects on optical elements, image transfer elements or materials, and on other elements in the image forming device.

In a first exemplary embodiment of the systems and methods according to this invention, an environment control unit provides air to a xerographic portion of the image forming device to maintain that portion at a desired temperature, relative humidity and pressure. One or more of the temperature, relative humidity and pressure are selected to substantially reduce the likelihood that water vapor will condense on that portion of the image forming device.

In various exemplary embodiments, the environment control unit operates in a semi-closed mode. In the semi-closed mode, air is cycled and recycled air through the portion, while additional air is added to maintain a desired pressure in that portion.

In a second exemplary embodiment of the systems and methods according to this invention, ambient air temperature, and the temperature and relative humidity in a portion of the image forming device are determined, along with a saturation temperature and a desired set point or control reference temperature of operation. In a first mode of operation of the second exemplary embodiment, the system air will be conditioned using an air conditioner. In this first mode, the air re-circulates in a closed loop through the air conditioner and at least that portion of the image forming device. In a second mode of operation of the second exemplary embodiment, the system air will be conditioned using only the blower, and will circulate in the closed loop.

In a third mode of operation of the second exemplary embodiment, the system air will be conditioned using the air conditioner. In this third mode, the air circulates through the air conditioner and at least that portion of the image forming device in a loop open to the ambient atmosphere. In a fourth mode of operation of the second exemplary embodiment, the system air will be conditioned using only the blower, and will circulate in the open loop condition.

These and other features of this invention are described in, or are present from, the following detailed description of the various exemplary embodiments of the dew point control methods and apparatus according to this invention.

BRIEF DESCRIPTION OF THE DRAWINGS

Various exemplary embodiments of this invention will be described in detail, with reference to the following figures, wherein:

FIG. 5 is a table of temperature and humidity values;

DETAILED DESCRIPTION OF PREFERRED EMBODIMENTS

Figure 1:
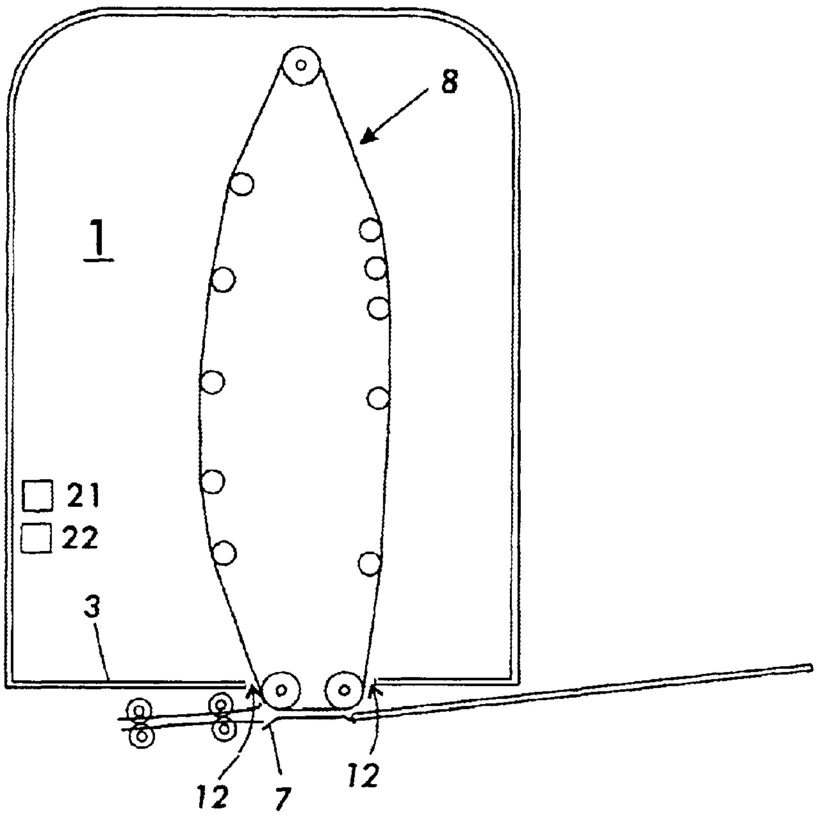
FIG. 1 is a schematic drawing of a side view of a xerographic portion of an image forming device.

FIG. 1 is a schematic drawing of a side view of a portion 1 of an image forming device whose atmosphere is maintained within desired pressure, temperature and humidity ranges by exemplary embodiments of the systems and methods of this invention. The air pressure is maintained at a pressure that prevents undesired elements from intruding into the portion, such as ambient air which has undesirably high moisture content and temperature values, or moisture contained in paper on which an image is to be formed. Other undesired elements include ozone created by the imaging process and toner used to develop latent images.

In various exemplary embodiments, the portion 1 of the image forming device is a xerographic module of the image forming device. In one embodiment, the xerographic module is an electroreprographic module. A small gap 12 is formed between a photoreceptor element 8 of the xerographic module and a wall 3 of the xerographic module 1 to prevent rapid pressure loss from within the xerographic module 1 while maintaining the pressure in the xerographic module 1 within desirable rates of air flow provided to and from the xerographic module 1. Further details of this xerographic module embodiment are discussed in the incorporated 105870 application.

Figure 2:
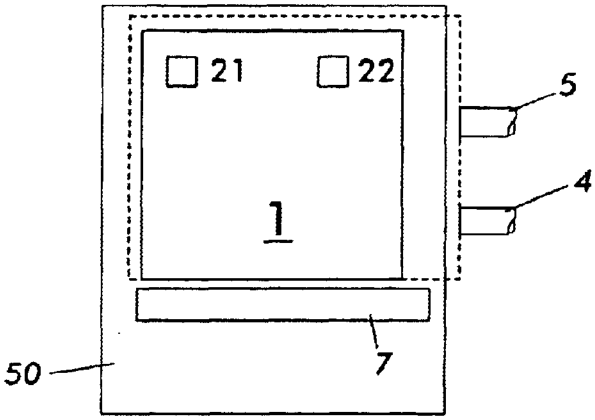
FIG. 2 is a schematic drawing of an end view of a the portion of the image forming device.

FIG. 2 shows an end view of the portion 1 depicted in FIG. 1, within an image forming device 50, including an air inlet passage 4 and an air exhaust passage 5 that allows air to circulate into and out of the portion 1. A temperature sensor 21 and a relative humidity sensor 22 are located within the portion 1 of the image forming device 50.

Figure 3:
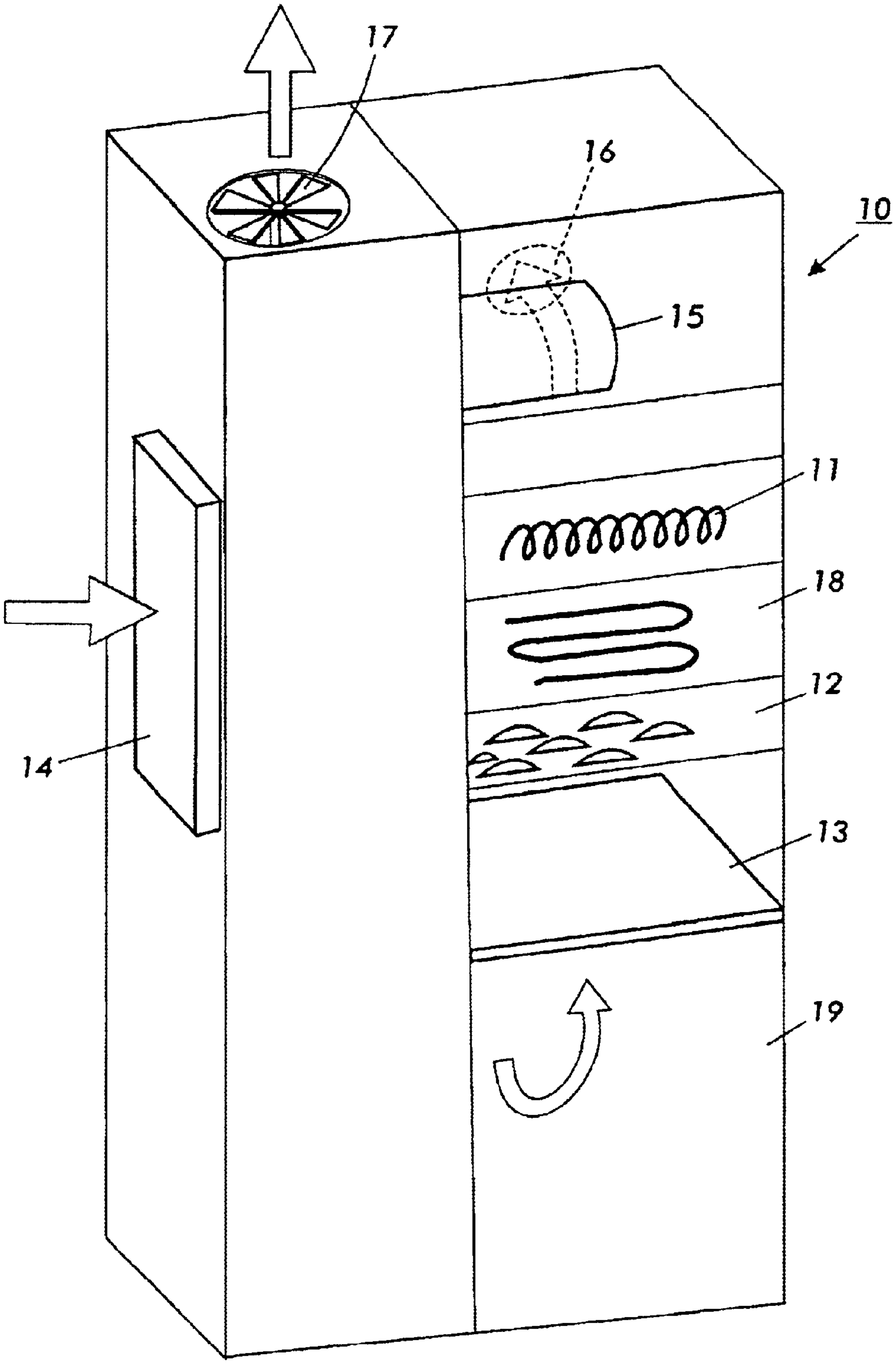
FIG. 3 illustrates a first exemplary embodiment of an environmental control unit portion of an image forming device used to maintain the atmosphere within a desired range of pressure, temperature and humidity according to this invention.

FIG. 3 illustrates an environmental control unit which is connected to the portion 1 of the image forming device to maintain the atmosphere of the portion 1 within a desired range of pressure, temperature and humidity. The environmental control unit 10 receives air from the portion 1 via the inlet portion 19 of the environmental control unit 10. That air is drawn upward by a blower 15 through a filter 13. In various exemplary embodiments, the filter 13 is a high energy particulate (HEPA) filter. The air is cooled in an evaporator 12, and is heated to a desired temperature range using an electric heater 11 and/or the heat of compression from the high-pressure side of a condenser 18. The air then passes through the blower 15, which exhausts the withdrawn air through an exhaust opening 16 from which the air is re-circulated to the portion 1 of the image forming device. The environmental control unit also contains a fan 17 which draws air through the condenser unit 14 of the air conditioner having evaporator portion 12. The air from the fan 17 may be exhausted to ambient atmosphere.

The temperature and humidity sensors 21 and 22 are provided to measure those parameters inside the portion 1 of the image forming device 50. Similar temperature and humidity sensors are positioned outside of the portion 1 to measure those parameters of the air being directed to the portion 1. A set point or desired operating range of temperatures has been determined for the portion 1. Also, a desired range of operational values of absolute humidity, expressed in terms of grains of water, has been determined for the portion 1.

Figure 4:
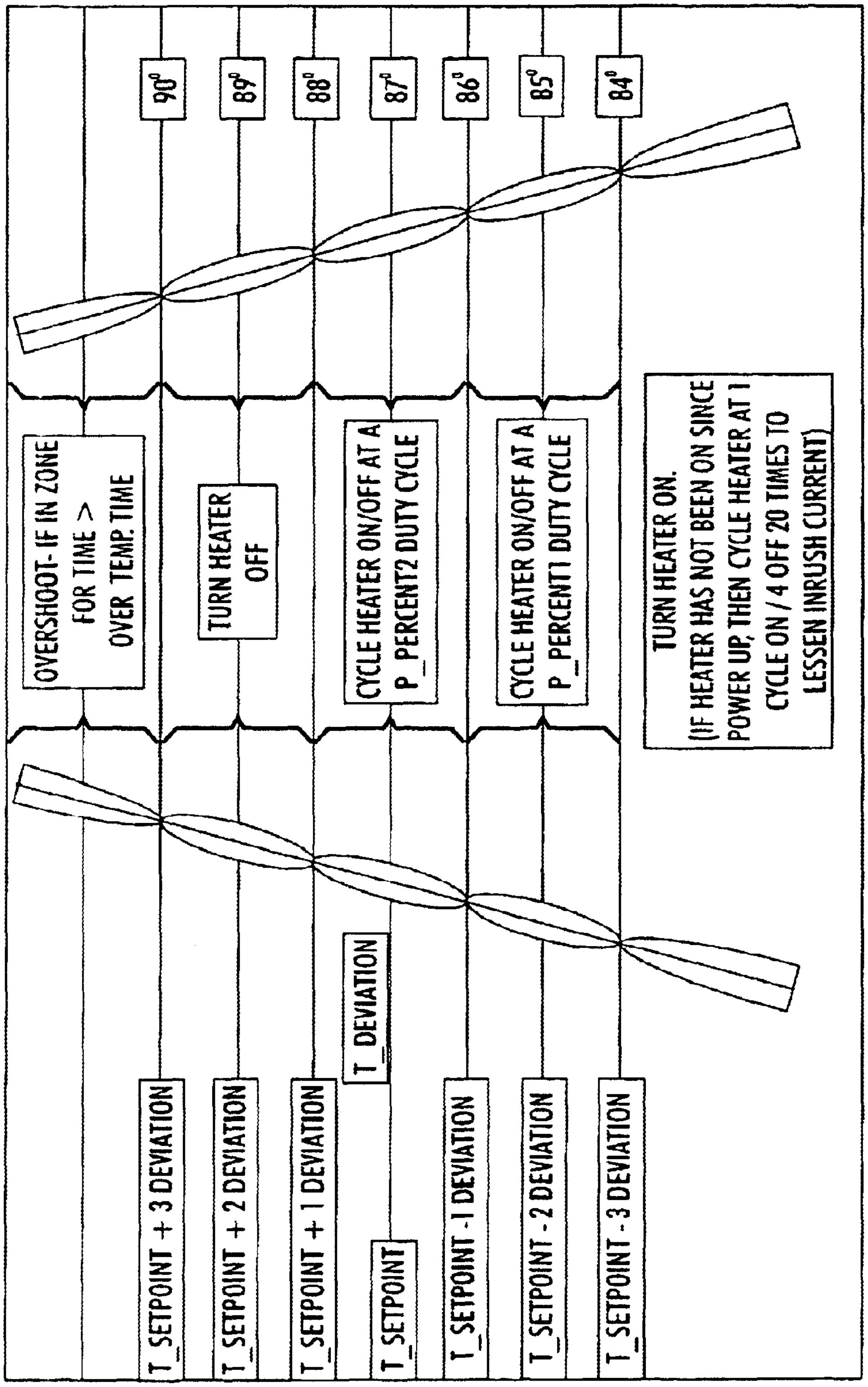
FIG. 4 is a control diagram outlining a first exemplary embodiment of a method for maintaining the atmosphere within a portion of an image forming device within a desired range of pressure, temperature and humidity values, according to this invention.

FIG. 4 shows one exemplary embodiment of a control diagram usable to maintain a desirable range of air temperatures in the portion. As shown in FIG. 4, the heater 11 of the environmental control unit 10 is cycled on and off at an appropriate duty cycle to maintain the temperature in the portion 1 within a range of temperatures. In various exemplary embodiments, the temperature in the portion 1 is maintained within 3° F. of the set point temperature. This example is for purposes of illustration only, and other suitable ranges of temperature may be selected to reduce dew formation within the xerographic module.

FIG. 5 defines the control areas as a function of grains of water. That is, in FIG. 5, the absolute humidity is indicated in units of grains of water with respect to the temperature and relative humidity of the air maintained in the portion 1 to reduce dew formation in that portion. In the illustrative embodiment highlighted by being outlined in the table, with a set point temperature of 87° F. and a desired temperature range from 84° to 90° F., the environmental control unit is operated to keep the relative humidity of the air forwarded to the portion with a relative humidity of between 10% and 22.5% to achieve an absolute humidity of the air in the portion 1 at or below 40 grains of water, which is desirable to avoid formation of dew in the xerographic module. The highlighted area is labeled 44 in FIG. 5.

The environmental control unit 10 is operated to not only keep the temperature and relative humidity within the suitable ranges, as indicated above, but also to maintain a suitable positive pressure with respect to the ambient pressure outside of the portion 1. In practice, one exemplary pressure in the xerographic control module 1 which results in limiting infusion of air with undesirable temperature and humidity characteristics, and which helps to keep out other contaminants, is a pressure of 0.25 inch of water. This pressure may vary as long as it is high enough to limit infusion of contaminants, such as toner and water vapor, and air with undesirable characteristics, such as a high relative humidity, and to expel other contaminants, such as ozone, from the portion 1.

In one exemplary range of operation of an embodiment of the invention, the environmental control unit 10 moves the air returned from the environmental control unit to the portion 1 at 300 cubic feet per minute (CFM), plus or minus 10%, to the portion having an internal pressure maintained at 0.25 inch of water, plus or minus 15%, at a temperature of 78° F. to 100° F. with an absolute humidity not exceeding 60 grains of water. The air in the portion 1 is moved at 225 CFM, in a temperature range of 85° F. to 105° F. with an absolute humidity of no more than 40 grains of water. To accomplish this, the environmental control unit draws in ambient air at 75 CFM, and conditions the indrawn or make-up air to be within a temperature range of 55° F. to 85° F. and having an absolute humidity of no more than 120 grains of water. Under these conditions, the air discharged from the environment unit 10 is filtered and discharged at 300 CFM, plus or minus 10%, at a pressure of 0.5 inch of water, plus of minus 15%, in a temperature range of 68° F. to 85° F. and with a maximum absolute humidity of 40 grains of water. Thus, the likelyhood a dew point condition will occur in the portion 1 is reduced and the air exhausted is filtered of contaminants, and is within a desirable range of temperature and humidity.

The temperature and relative humidity sensors are provided to measure the temperature and relative humidity not only in the portion 1, but also in the air conditioned by the environmental control unit 10, which may include the air drawn from the ambient environment, for circulation to the portion 1.

The area of the small gap 12 used to prevent rapid pressure loss is chosen to maintain a suitable positive pressure in the portion 1 while preventing rapid loss of pressure from the portion 1. The area can vary within wide limits. Illustrative embodiments range from less than one square inch to 20 square inches, with one exemplary embodiment being 10 square inches. The gap 12 may vary in shape and location in the portion 1.

Figure 6:
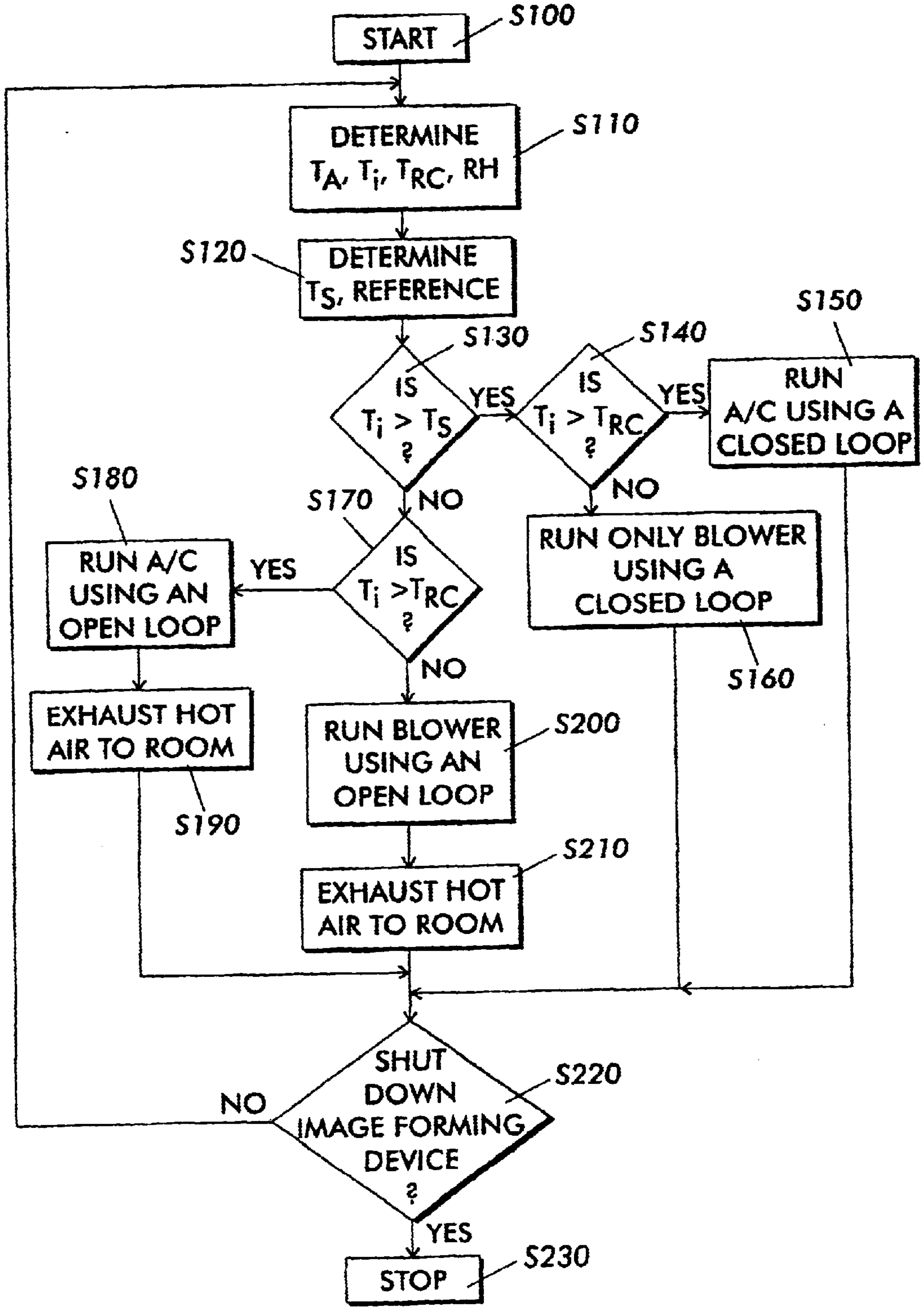
FIG. 6 is a flow chart outlining a second exemplary embodiment of a method for maintaining the atmosphere within a xerographic portion of an image forming device within a desired range of temperature and humidity values according to this invention.

FIG. 6 is a flow chart illustrating the operation of a second illustrative embodiment of the invention which operates over a relatively wide temperature and relative humidity range. Control starts in step S100, In step S110, temperature $T_A$ and the relative humidity RH of the ambient air drawn into the portion 1 is measured, and the internal temperature $T_i$ of the portion 1 is measured. Additionally, a reference or set point temperature $T_{RC}$ of air in the portion 1 is determined. In step 120, a saturation temperature $T_S$ of the air in portion 1 is determined, and the reference or set point temperature is determined. Then, in step S130, a determination is made whether the internal air temperature $T_i$ is above the saturation temperature $T_S$. If so, control proceeds to step S140. Otherwise, control jumps to step S170.

In step S170 a determination is whether the internal temperature $T_i$ is above the reference temperature $T_{RC}$. If so, control proceeds to step S150. Otherwise control jumps to step S160.

I step S150 the system is operated in a first exemplary mode of operation. In the first mode, an air conditioner is used to cool the air which is circulated through a closed loop system including the portion 1. Control then jumps to step S220. In contrast, in step S160, the system is operated in a second mode of operation. In the second mode, only the blower, but not the air conditioner, is run to simply re-circulate the air through the closed loop system, including the portion 1. Control them jumps to step S220.

In step S170, a determination is made whether the internal temperature $T_i$ is above the reference temperature $T_{RC}$. If so, control proceeds to step S180. Otherwise control jumps to step S220.

In step S110, the system is operated in a third mode of operation. In the third mode, an air conditioner is run in an open loop which includes the portion 1. Then, in step S190, hot air is exhausted to the ambient atmosphere, to cool the air circulating through the image forming device including portion 1. Controller then jumps to step S220.

In contrast, in step S200 the system is operated in a fourth mode of operation. In the fourth mode, only a blower is run, but not an air conditioner, in an open loop, including the portion 1. Then, in step S210, hot air is exhausted to the ambient atmosphere. Control then proceeds to step S220. A determination is made whether the image forming device should be shut down. The criteria used to determine if it should shut down include situations in which the systems do not avoid a dew point condition in portion 1, or extremely high operating temperatures. If so, control proceeds to step S230 and shuts down the system. Otherwise, control jumps back to step S110.

Figure 7:
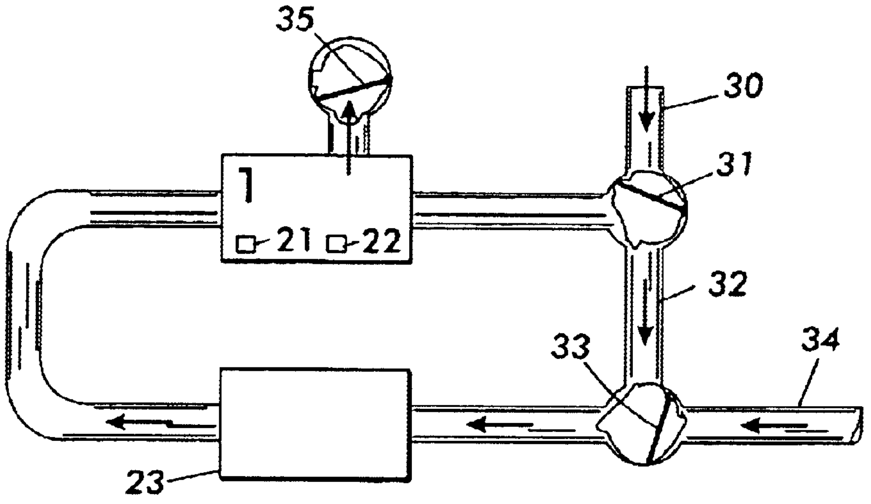
FIG. 7 is a schematic view of a system operated in first and second modes of operation of the second exemplary embodiment.

FIG. 7 illustrates a closed loop system with an image forming device portion 1, the temperature sensor 21, the relative humidity sensor 22, and an air modification element 23, which includes the air conditioner and the blower. The closed loop system shown in FIG. 7 may be used to operate the first and second modes of operation of the second exemplary embodiment of the invention. In FIG. 7, the closed loop is formed by closing off valve elements 31, 33 and 35, as shown. Air flow 32 represents air which is re-circulated in the system.

Figure 8:
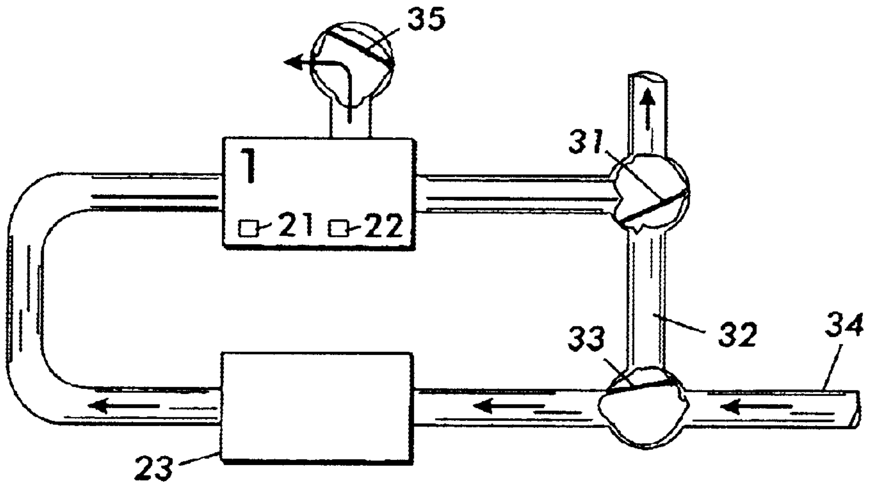
FIG. 8 is a schematic view of the system operated in third and fourth modes of operation of the second exemplary embodiment.

FIG. 8 illustrates an open loop system with the image forming device portion 1, the temperature sensor 21, the relative humidity sensor 22, and the air modification element 23. The open loop system shown in FIG. 8 may be used to operate the second and third modes of operation of the second exemplary embodiment of the invention. conditioning blower motor is operated to move the air to and from the xerographic module/chamber. In FIG. 8, the open loop is formed by closing valves 31 and 33, as shown, and opening valve 35, as shown.

Figure 9:
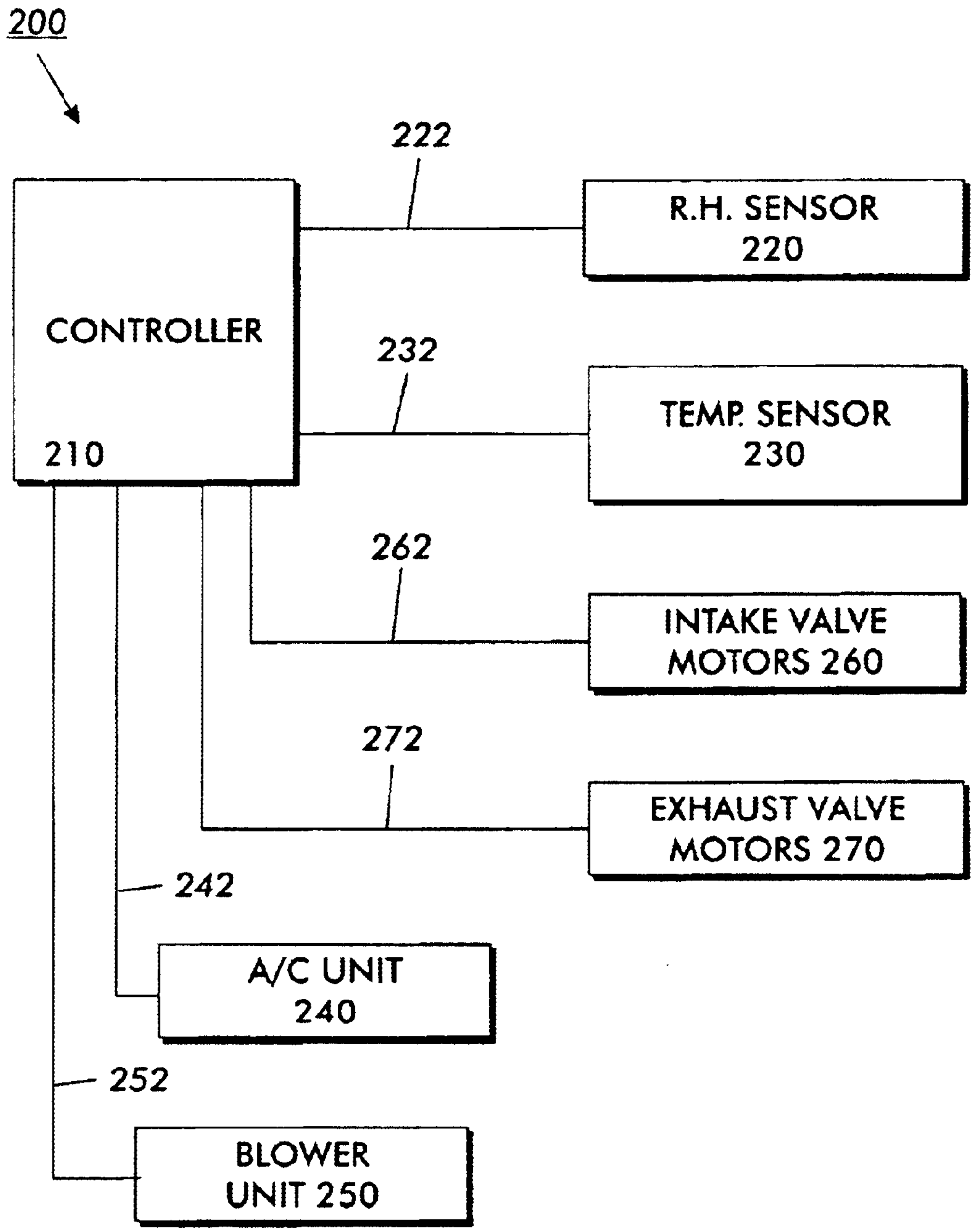
FIG. 9 is a block diagram of a control system according to this invention.

FIG. 9 shows one exemplary embodiment of a control system 200 usable to maintain the temperature and humidity characteristics of the air in portion 1 at desired values to avoid condensation of water vapor in portion 1. A shown in FIG. 9, the control system includes a controller 210 connected via a link 222 to a relative humidity sensor 220, a) link 232 to a temperature sensor 230, a link 262 to intake valve motors 260, a link 272 to exhaust valve motors 270, a link 242 to an air conditioning unit 240, and a link 252 to a blower unit 250. The controller 210 receives signals from the relative humidity and temperature sensors and processes the signals to control the air intake motors 260 and exhaust valve motors 270 and the air conditioning unit 240 and the blower unit 250 to maintain air temperature and relative humidity in portion 1 within desired ranges to reduce occurrence of moisture condensation in portion 1.

Figure 10:
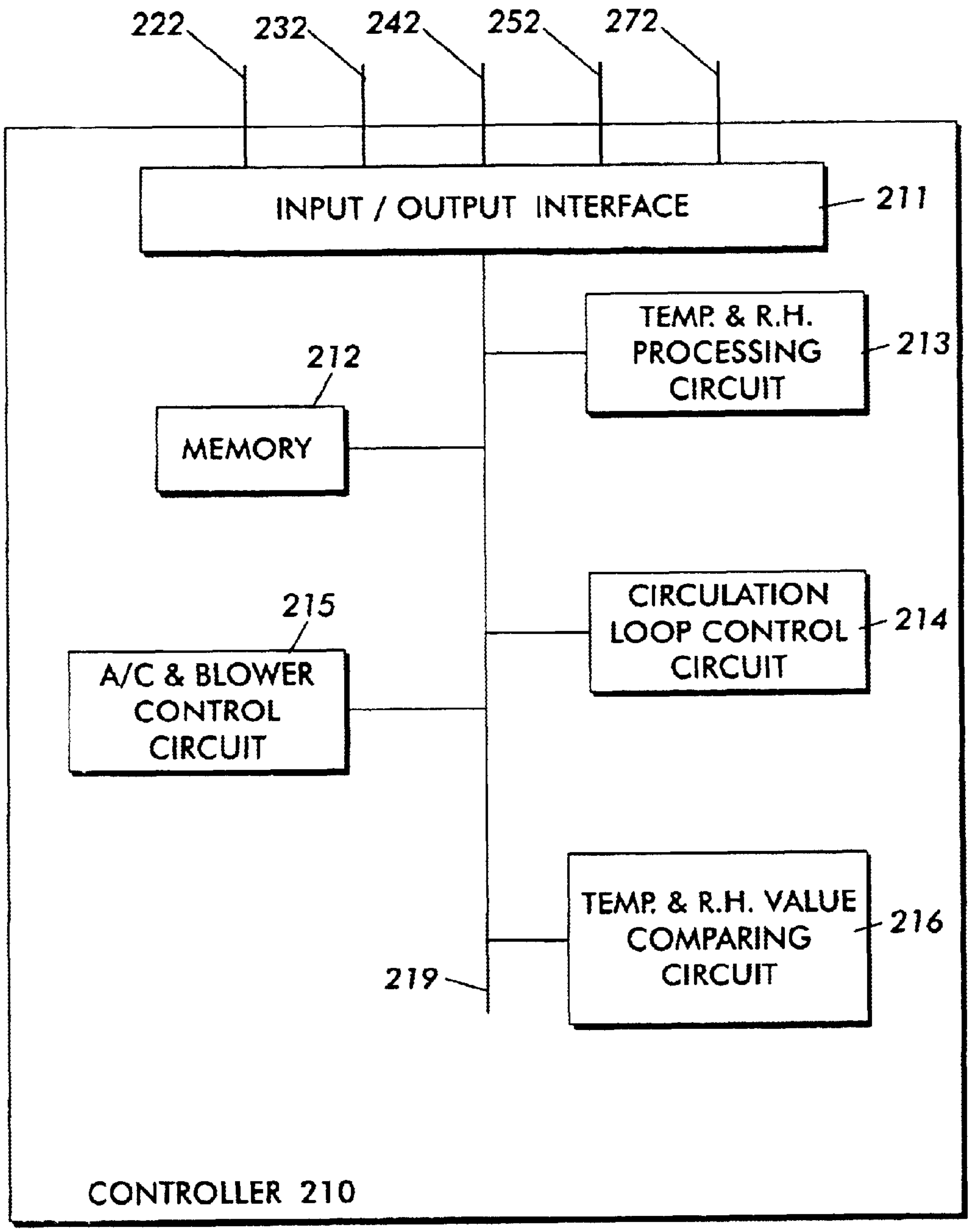
FIG. 10 is block diagram of elements of a controller portion of the control system of this invention.

FIG. 10 shows in greater detail one exemplary embodiment of the controller 210. As shown in FIG. 10, the controller 210 includes an I/O interface 211, a memory 212, a temperature and relative humidity processing circuit 213, a circulation loop control circuit 214, an air conditioning and blower control circuit 215, and a temperature and relative humidity value comparing circuit 216, interconnected by a data control bus. The interface 211 connects to the links 222, 232, 242, 252, 262 and 272 and to the data control bus 219 to transmit data and control signals to and from the control units 213-216 and/or memory 212 of the controller 210.

In operation, signals from the temperature sensor 230 and relative humidity sensor 230 are detected by controller 210 through the interface 211. These signals are sampled by the temperature determination and processing circuit 213 to determine the temperature and relative humidity of the air in portion 1, and to determine saturation temperature and a reference temperature within portion 1, and to forward these parameters to a temperature and relative humidity value comparison circuit where they are compared. The four exemplary modes of operation of the invention, described above, are then carried out by the circulation loop control circuit 216 and the air conditioning and blower control circuit 215 based on the comparisons of those parameters.

The controller 210 may be implemented on a programmed general purpose computer. However, the controller 210 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the control functions referred to above can be used to implement the invention. The links 222–272 can be implemented by any known or later developed device or system for connecting the controller 210 to the components 220–270. In general, the links 222–272 can be any known or later developer connection system or structure usable to connect the controller 210 to the components 220–270.

The second illustrative embodiment may be used with a portion 1 which is either maintained at atmospheric pressure or above atmospheric pressure.

Figure 11:
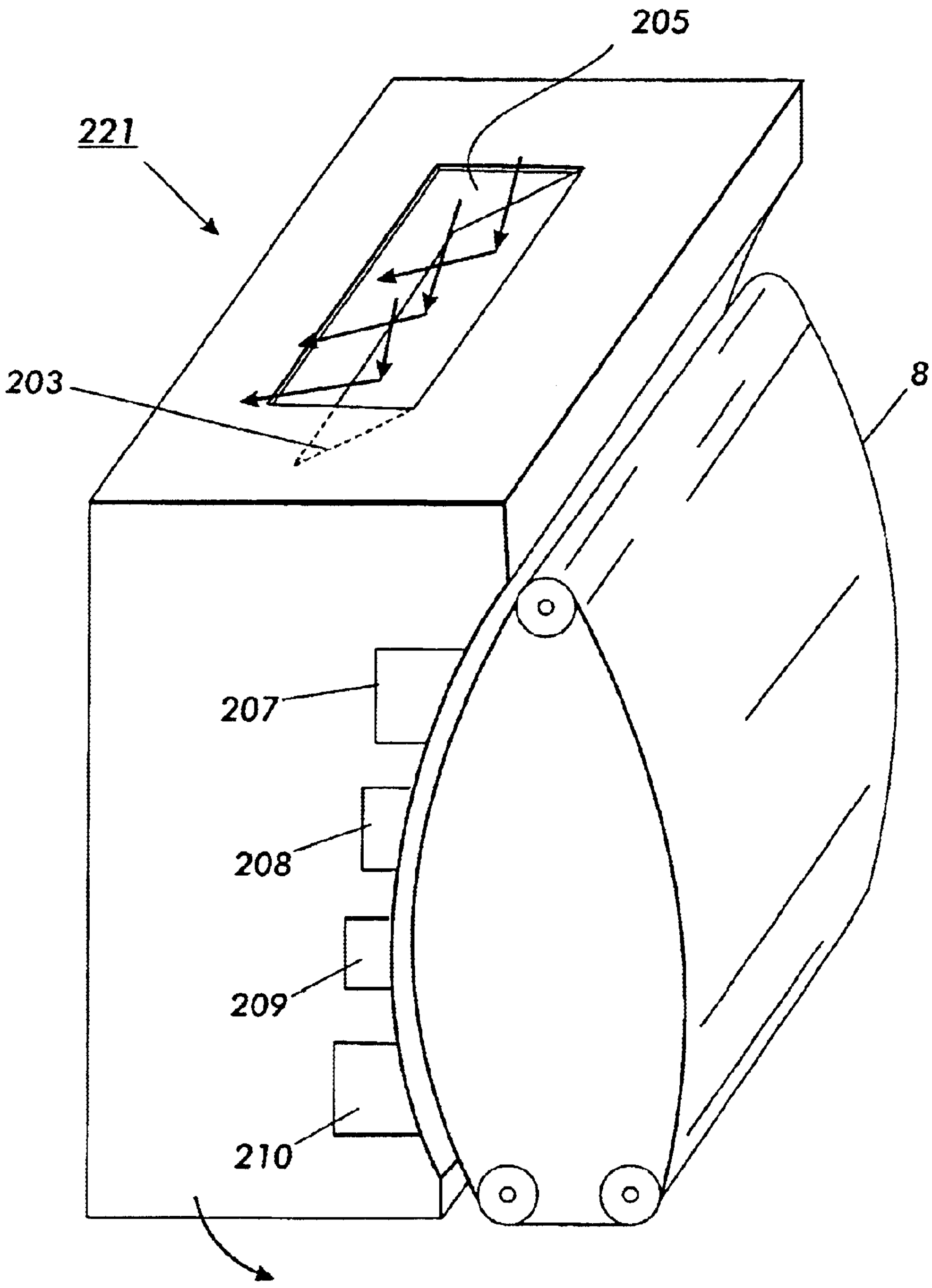
FIG. 11 is a schematic perspective view of an air diffuser embodiment of this invention.
Figure 12:
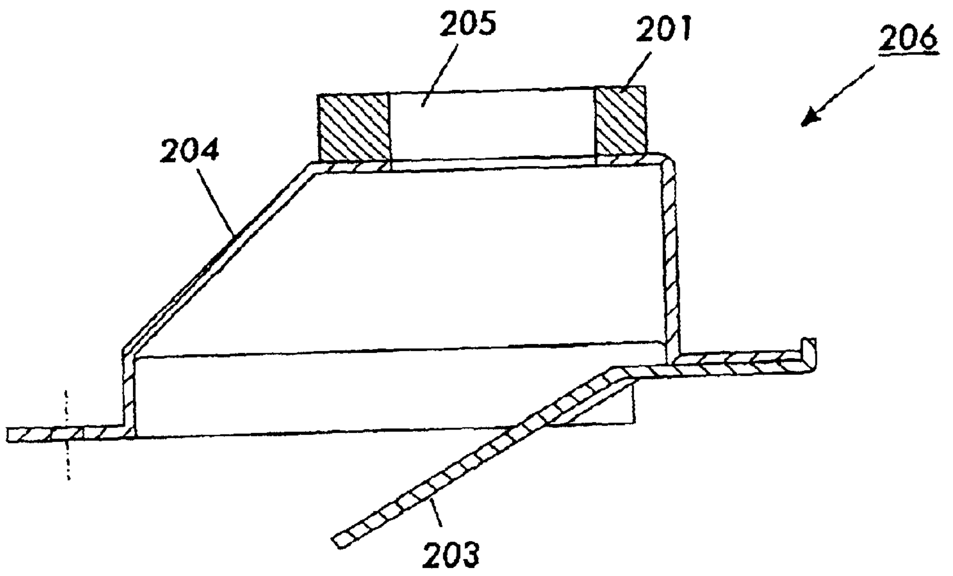
FIG. 12 is a cross-sectional view of an air diffuser element of this invention.
Figure 13:
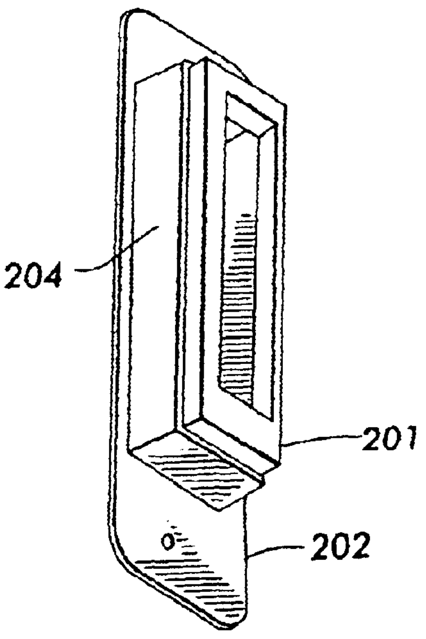
FIG. 13 is a perspective view of an air diffuser element of this invention.

FIG. 11 shows an embodiment in which air turbulence within the xerographic module 1 is reduced to a minimum. If turbulent air is allowed into the development stations 207–210, typically using three chromatic toners, such as, for example, cyan, yellow and magenta, and one achromatic toner, such as, for example, black, turbulent air will usually pick up toner particles from the development stations and deposit some of it on the substrate, e.g., paper, on which an image is to be developed and fixed, resulting in relatively dirty printed images. To minimize air flow induced airborne toner in the xerographic module 1, the invention uses an air deflector unit 221. This unit is located in one wall, such as, for example a top wall and has an opening 205 through which air enters the xerographic module housing 221 development stations 207–210. According to the invention, the speed of the air entering the module 1 via opening 205 is controlled and is deflected by deflector element 203 against the wall of the module housing 221 which is opposite to the development stations. In this manner, the air is prevented from directly impacting against the development units 207–210. As a result, the deflected, relatively non-turbulent air flow in the module housing 221 picks up relatively smaller amounts of toner and the images produced by the xerographic module are cleaner than they would otherwise be if toner were picked up by undeflected, relatively turbulent air flow. FIGS. 12 and 13 show construction details of an illustrative embodiment of the deflector housing 206. Deflector housing 206 comprises an upper housing portion 201 containing opening 205, lower housing 204, flange plate 202 and deflector plate 203.

While this invention has been described in conjunction with the exemplary embodiments set forth above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An air diffuser for a xerographic module comprising:

a housing having one or more xerographic development stations; and an air deflector element located in the housing and including an element located in the housing oriented to deflect air entering the housing away from at least one development station.

2. The air diffuser of claim 1, wherein the housing has side walls and the deflector is oriented to deflect the air to at least one side wall away from the location of the at least one development station.

3. The air diffuser of claim 1, wherein the air deflector element is arranged to minimize turbulence within the xerographic module.

4. The air diffuser of claim 3, wherein turbulence is minimized as a result of an angle of the air deflector element.

5. The air diffuser of claim 3, wherein turbulence is minimized as a result of a size of entry of the air deflector element.

6. The air diffuser of claim 3, wherein turbulence is minimized as a result of a speed of air entering the module and being deflected by the air deflector element.

7. The air diffuser of claim 1, wherein the air deflector element is arranged to prevent direct impact of the air against the at least one development station.

8. The air diffuser of claim 1, further comprising an opening in a top wall of the housing, the air deflector element comprising a flap of the housing material attached along an edge thereof to a top wall of the housing.

9. An electroreprographic module comprising at least one development station disposed in a housing, the housing comprising side walls and a top wall, the module further comprising an air diffuser located in the housing to deflect air entering the housing away from the at least one development station.

10. The module of claim 9, wherein the air diffuser comprises an air deflector element including a portion of a wall of the housing.

11. The module claim 10, wherein the air deflector element is a flap of housing material protruding into the housing such that air entering the housing is deflected to minimize turbulent air flow.

12. The module of claim 9, wherein the air diffuser comprises an adjustable air deflector element.

13. The air diffuser of claim 9, wherein air entering the housing via the air diffuser is controlled by the diffuser through a combination of at least two of size of entry, angle of incidence, and speed.

14. An air diffuser for an electroreprographic module comprising at least one development station in a housing, the air diffuser comprising an air deflector element arranged to deflect turbulent air flow entering the housing thereby preventing toner laden air from directly impacting against the at least one development station.

15. The air diffuser of claim 14, wherein the portion of one of the walls is a flap of material pushed into the housing to form an opening through which air enters the housing.

16. The air diffuser of claim 15, wherein the opening is sized to minimize turbulence of air passing therethrough.

17. The air diffuser of claim 15, wherein the flap protrudes into the housing at an angle relative to the wall of the housing such that turbulence of air passing thereover is minimized.

18. The air diffuser of claim 14, wherein the housing comprises a top wall and side walls and the air deflector element is a portion of one of the walls.

* * * * *